Figure 1:
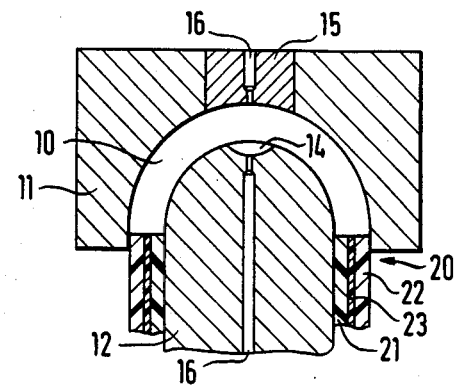

United States Patent [19]

Reymann et al.

[11] Patent Number: 4,719,069
[45] Date of Patent: Jan. 12, 1988

[54] METHOD FOR MAKING A PREFORM CONSISTING OF AT LEAST THREE LAYERS OF THERMOPLASTIC MATERIAL

[75] Inventors: Wolfgang Reymann; Günter Kleimenhagen, both of Hamburg, Fed. Rep. of Germany

[73] Assignee: Krupp Corpoplast Maschinenbau GmbH, Fed. Rep. of Germany

[21] Appl. No.: 862,713

[22] Filed: May 13, 1986

[30] Foreign Application Priority Data

May 22, 1985 [DE] Fed. Rep. of Germany ....... 3518441

[51] Int. Cl.⁴ .................. B29C 31/08; B29C 43/20; B29C 47/06; B29C 57/10
[52] U.S. Cl. ............................ 264/296; 264/322; 264/323; 264/512; 264/515
[58] Field of Search ............... 264/512, 515, 296, 514, 264/323, 322

[56] References Cited

U.S. PATENT DOCUMENTS

| 3,832,437 | 8/1974 | Taylor | 264/296 X |
| 3,929,943 | 12/1975 | Klimaszewski, Jr. | 264/322 X |
| 4,219,525 | 8/1980 | Greenspan | 264/296 |
| 4,424,182 | 1/1984 | Cerny | 264/322 X |

Primary Examiner—Jan H. Silbaugh
Assistant Examiner—Karen D. Kutach
Attorney, Agent, or Firm—Harness, Dickey & Pierce

[57] ABSTRACT

A method and an apparatus for making blow-moulded bottle from a preform consisting of at least three layers. For making the preform a tube section heated at one end is shaped by pushing into a closed bottom mould to form a bottom and pressure is exerted in the axial direction on the center bottom region to close the still present gaps in an outer layer as soon as an inner layer has flowed together.

6 Claims, 4 Drawing Figures

METHOD FOR MAKING A PREFORM CONSISTING OF AT LEAST THREE LAYERS OF THERMOPLASTIC MATERIAL

The invention relates to a method of making a preform consisting of at least three layers of thermoplastic plastic for blow-forming a hollowing body, in particular a bottle, having the features set forth in the preamble of claim 1.

To improve gas barrier properties a tube section is used which is made up of three or more layers, the inner and outer layer consisting of thermoplastic plastic (e.g. PET) and the centre layer or centre layers consisting of a material with high barrier properties.

Now, if before the blow-moulding the warmed end region of the preform is shaped to a closed bottom there is a danger of the centre layer serving as barrier layer preventing satisfactory welding of the inner and outer layers.

In this connection it is known (U.S. Pat. No. 4,424,182) to preform a bottom by rolling on a tube section consisting of three layers, straighten the end face by cutting blades and finally press the bottom into a mould. The production expenditure is thus considerable.

According to an elder proposal (P 33 42 240.0) of applicants on a tube section a bottom is formed by pushing the tube section into the mould cavity defined by an inner mandrel or core and an outer mould. The tube section consists of homogeneous material and with a relatively large diameter has a small wall thickness.

According to another proposal (P 34 07 060.5) of applicants before the reshaping to form the bottom at the end region to be shaped in the portion adjoining the end face the plastic of the centre layer or layers is removed.

The invention is based on the problem of providing a method of the type outlined at the beginning with which in simple manner on the tube section a bottom can be formed which is satisfactorily welded.

According to the invention said problem is solved by the features set forth in the characterizing clause of claim 1. Further claims are directed to advantageous further developments of the invention and to an apparatus according to the invention for carrying out the method.

With the method according to the invention when the heated end of the tube section is pushed in folding is avoided. On insertion the outer layer remains behind compared with the inner layer so that the latter first flows together. In the outer layer a gap is then still present which is closed by exerting pressure on the outer layer, the material of the outer layer thereby being forced towards the centre and simultaneously a hydrostatic pressure exerted on the entire weld in the centre. This provides a satisfactory welding both of the inner and of the outer layer, between which the centre layer is included which comes together in the bottom centre or at the most still has a small gap. An overlapping of the centre layers is however not intended. The invention thus avoids displacement of the material of the centre layer by folding which prevents satisfactory welding of the inner or outer layer or leads to a weakened weld.

With the method and apparatus according to the invention the inner and outer layers can be satisfactorily joined together in the centre of the bottom. The bottom centre of the preform when subsequently subjected to stretching load for biaxial orientation of the hollow body thus exhibits excellent durability. The barrier function of the centre layer is retained.

An example of embodiment of the invention will be explained hereinafter with the aid of the drawings, wherein:

FIGS. 1 to 4 each show a section through a bottom mould, the shaping of the tube section to form the bottom being shown progressively.

In the drawings in each case a mould cavity 10 is formed between an outer mould 11 and an inner core or mandrel 12. In the region of the dome of the inner mandrel 12 a recess 14 is provided. The mould cavity 10 preferably has a hemispherical shell shape.

In the outer mould 11 an axially displaceable ram 15 is disposed which is actuated by a drive which is not illustrated. In the inner mandrel 12 and the ram 15 narrow vent bores 16 are provided.

A tube section 20 consists of an inner layer 21, an outer layer 22 and a centre barrier layer 23. The tube section is coextruded and for shaping the bottom is heated at the end to the moulding temperature.

FIG. 1 shows the initial state of the moulding or shaping operation in which the bottom mould is closed and the tube section held on the inner mandrel 12 enters the mould cavity 10. From its cold end the tube section 20 is inserted in the axial direction into the mould cavity 10. The drive necessary for this purpose is not illustrated.

Figure 2:
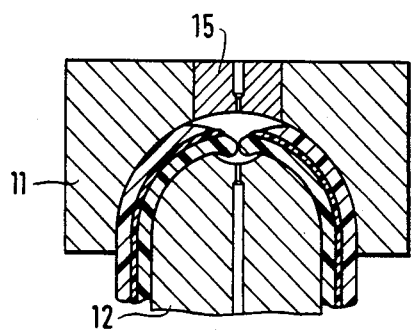

FIG. 2 shows how the molten material at the tube end fills the mould cavity 10. The outer layer 22 trails the inner layer 21. The time illustrated is the instant at which the inner layer 21 just begins to close in the centre.

Figure 3:
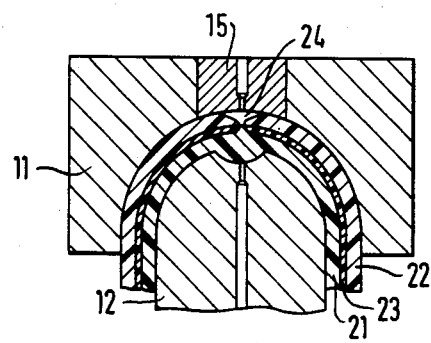
Figure 4:
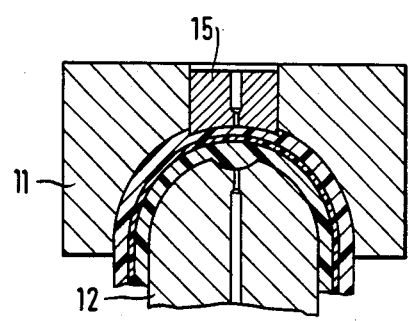

FIG. 3 shows the operation progressed to such an extent that the closing of the inner layer 21 is complete. Material of the inner layer has been forced into the recess 14 so that the gap 24 still to be closed is relatively small and a displacement of the barrier layer 23 is avoided, the end sides of which preferably abutting each other as shown in FIG. 3 or possibly still having between them a small gap. At this instant, i.e. when the closure of the inner layer 21 is complete, in accordance with FIG. 4 the gap 24 is closed in that the ram 15 executes an axial movement and therefore forces the material of the outer layer 22 towards the centre and at the same time exerts a hydrostatic pressure on the entire weld in the centre. The axial movement of the tube section 20 is preferably interrupted when this is done. Via the vent bores 16 included air can escape.

The exact instant for initiating the movement of the ram 15 is preferably derived from the feed position of the tube section 20. Thus, when the tube section has reached a certain position its further feed is interrupted and the ram 15 actuated. The small cross-sectional reduction of the outer layer 22 apparent in FIG. 4 has no detrimental effects whatever in the subsequent blowing operation.

The drives for the tube section 20 and the cam 15 and for opening the bottom mould are not shown. The necessary travel movements can be obtained in known manner by servo cylinders or mechanically by means of cam discs.

We claim:

1. Method of making a preform consisting of at least three layers of thermoplastic material from a tube comprised of inner and outer layers and a centre barrier layer for blow-moulding a hollow body comprising the steps of heating said tube at one end region to deformation temperature and inserting said tube with said heated end region into a mould cavity having a closed bottom, formed by a mandrel and an outer mould, pushing said heated end region of said tube into said closed bottom of said mould cavity such that on said insertion said outer layer remains behind while said inner layer flows together first, leaving a gap in said outer layer which is closed by exerting a weld pressure on said outer layer.

2. Method according to claim 1, characterized in that on application of said weld pressure to said outer layer said pushing of said heated end of said tube into said mould cavity is interrupted.

3. The method according to claim 1 wherein said outer mould supports an axially displaceable ram for applying said weld pressure.

4. The method according to claim 3, characterized in that a mandrel dome is formed with a recess for receiving displaced material of said inner layer.

5. The method according to claim 3 characterized in that are provided for relieving pressure upon said pushing.

6. The method according to claim 3 characterized in that said mould cavity has a hemispherical shell shape.

* * * * *